Mar. 13, 1923.
J. F. O'CONNOR.
FRICTION SHOCK ABSORBING MECHANISM.
FILED JUNE 24, 1921.
1,448,502.
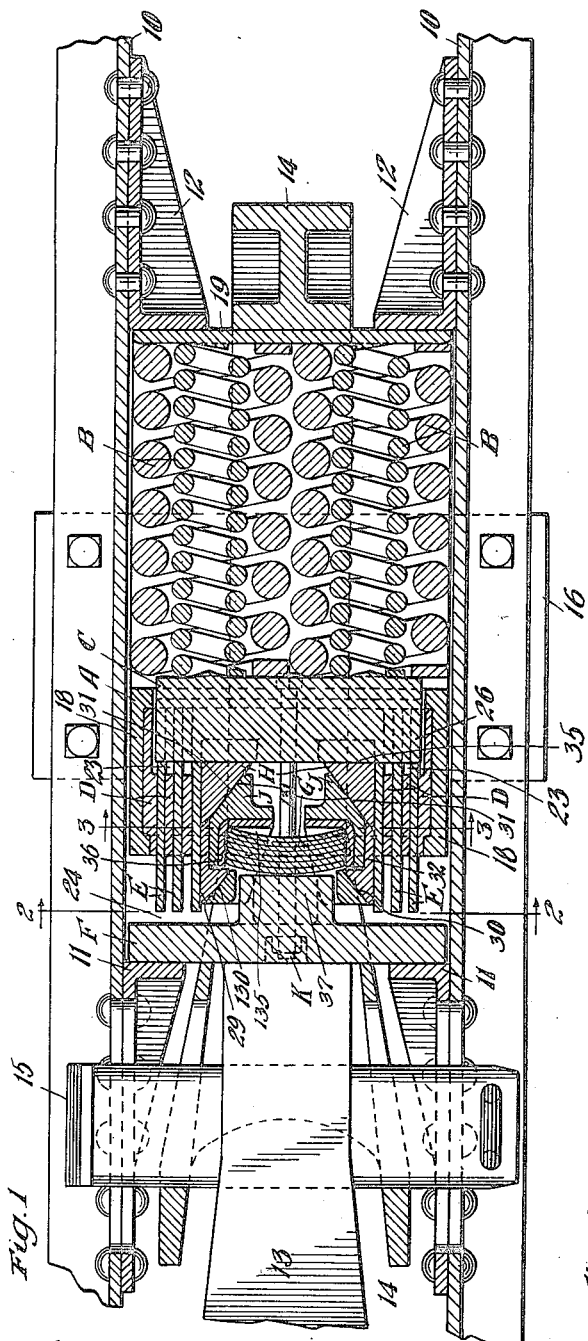
Witnesses
Wm. Geiger
Inventor
John F. O'Connor
By Geo. I. Haight
His Atty.

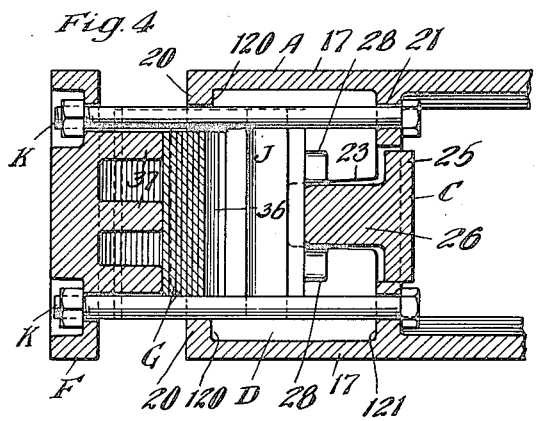
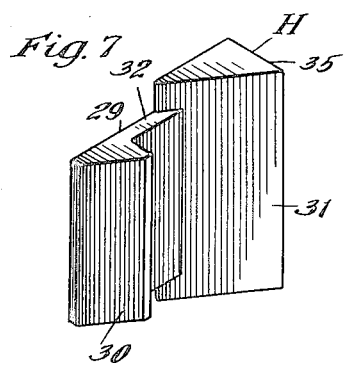
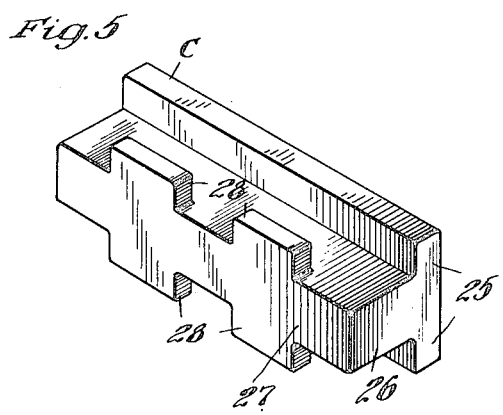
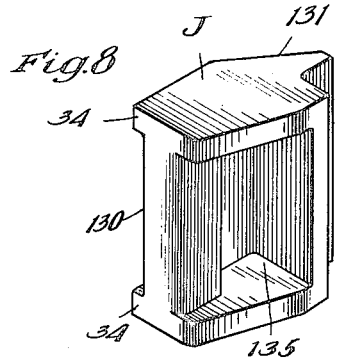
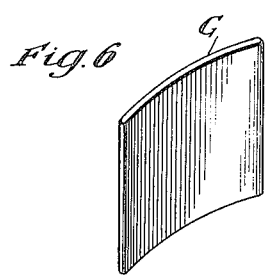
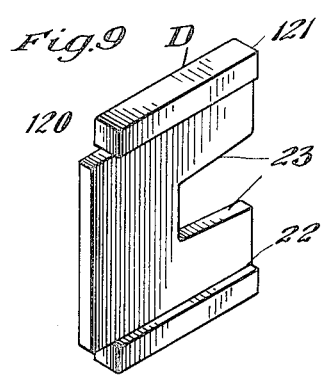

Patented Mar. 13, 1923.

1,448,502

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed June 24, 1921. Serial No. 480,027.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings forming a part of this specification.

This invention relates to improvements in friction shock absorbing mechanisms.

One object of the invention is to provide a friction shock absorbing mechanism especially adapted for railway draft riggings wherein are obtained high capacity, long life, large frictional wearing areas and a smooth graduated action.

A specific object of the invention is to provide a novel and highly efficient wedging or spreading system or unit and more particularly such a system or unit which will automatically compensate for wear on the parts.

Other objects of the invention will more clearly appear from the description and claims hereinafter following.

In the drawings forming a part of this specification, Fig. 1 is a horizontal longitudinal sectional view of a portion of a railway draft rigging showing my improvements in connection therewith. Fig. 2 is a vertical transverse sectional view corresponding substantially to the line 2—2 of Fig. 1. Fig. 3 is an enlarged transverse vertical sectional view of the shock absorbing mechanism proper corresponding to the line 3—3 of Fig. 1. Fig. 4 is a vertical longitudinal sectional view corresponding substantially to the line 4—4 of Fig. 3. Figs. 5, 6, 7, 8 and 9 are detail perspectives of the spring follower, one of the wedging spring plates, one of the friction shoes, one of the wedge blocks and one of the stationary friction plates, respectively.

In said drawings, 10—10 denote channel draft sills of a car underframe to the inner faces of which are secured front stop lugs 11 and rear stop lugs 12. A portion of a draw bar is indicated at 13, the same being operatively associated with the shock absorbing mechanism proper by a hooded cast yoke 14 and coupler key 15. The yoke and shock absorbing mechanism therewithin are supported in operative position by a detachable saddle plate 16.

The improved shock absorbing mechanism proper, as shown, comprises, broadly, a casting A; twin springs B—B; a spring follower C; a series of relatively stationary friction plates D—D; a series of relatively movable friction plates E—E; a front follower F; a series of spreader spring plates G—G; a pair of friction shoes H—H; a pair of wedge blocks J—J; and retainer bolts K—K.

The casting A is formed with upper and lower walls 17—17, side walls 18—18, and an integral vertical rear wall 19 uniting the top and bottom walls 17. Said wall 19 functions as the rear follower of the mechanism. The side walls 18 are relatively short so as to leave the major portion of the casting open on the sides to permit of the insertion and removal of the spring follower C and springs B. At its forward end, it will be observed that the casting A provides what may be termed a hollow casing or shell and rearwardly thereof constitutes a cage for the springs.

The casing section of the casting A contains the friction elements and the top and bottom walls 17 are provided with vertically alined, transversely extending ribs 20 and 21 providing rearwardly and forwardly facing shoulders cooperable with the shoulders 120 and 121, respectively, of the stationary plates D—D, so as to anchor the latter against longitudinal movement but leaving them responsive to laterally applied pressure.

The friction plates D have their upper and lower edges thickened as best shown in Figs. 3 and 9 and on the sides thereof are formed with channel grooves or guides 22 for the movable plates E. The outermost stationary plates D have only one channel guide or groove on the inner side thereof as shown in Fig. 3, the outer sides of said outer plates D being countersunk into the side wall 18 of the casting A. The forward ends of the plates D terminate flush with the end of the casting A. At their inner ends, the plates D are cut away with forwardly tapering recesses as indicated at 23 for the purposes hereinafter described.

The movable plates E are of flat rectangular form, the same being alternated with the stationary plates D. The alternated plates are preferably divided into two laterally separated groups as best shown in Fig. 1 to thereby leave a central space for reception of the pressure-transmitting spreading means hereinafter described. Normally the forward ends of the plates E project outwardly from the casting and are separated a slight distance as indicated at 24 from the follower F, said distance approximating a half inch in actual practice. The inner ends of the plates E normally terminate within the stationary plates D, as shown in Fig. 1 and in actual practice the length of said plates E will be equal to or less in length than the stationary plates D.

The springs B are disposed in horizontal twin arrangement as shown and bear at their forward ends against the spring follower C. The latter is formed at its rear with a transversely extending vertical flange section 25 and extended forwardly therefrom centrally is a horizontal heavy rib 26. The forward face 27 of the latter acts as a bearing for the rear edges of the movable plates E, it being understood that the heavy rib 26 is adapted to work back and forth within the recesses 23 of the stationary plates D. With this arrangement, I am enabled to make the overall length of the friction elements unusually short for a given area of frictional contact between the stationary and movable plates and at the same time have the movable plates pushed alternately at their front and rear ends during compression and release, respectively. At its forward portion, the follower C is provided with upwardly and downwardly extended flanges 28—28 separated laterally as best shown in Fig. 5, said flanges forming extended bearings for the friction-shoes H.

The friction-shoes H are two in number, each being in direct engagement on its outer surface 29 with the corresponding innermost movable plate E. On its inner side, each shoe H is formed with two wedge surfaces 30 and 31, separated by an intermediate section 32. The vertical height of the wedge section 30 and the intermediate section 32 is made less than the vertical height of the wedge section 31, as shown in Fig. 7, for the purpose hereinafter described. At its inner end, the shoe H is formed with a transverse bearing face 35 which bears against the spring follower C and more particularly on the flanges 28—28 of the latter.

The two wedge elements J are of like construction and each is formed on its outer side with a wedge surface 130 and another wedge surface 131, longitudinally separated and adapted to cooperate with the wedge surfaces 30 and 31, respectively, of the corresponding shoe H. At the top and bottom, each wedge J is provided with laterally extended flanges 34—34 arranged to straddle the wedge sections 30 and intermediate sections 32 of the shoes H so as to maintain the proper alinement between the shoes H and wedges J. On its inner side, each wedge J is provided with a right angular pocket 135 in which is preferably seated a hardened wear plate 36 as shown in Fig. 1. Said wear plates 36 provide bearings for the nested series of bowed spring steel plates G of which any suitable number may be employed having the desired capacity and flexible movement.

The spring plates G are bowed outwardly as clearly shown in Fig. 1 and the outermost one thereof bears against the inner end of a block 37 formed integrally with the follower F at the center of the latter. Said block 37 telescopes between the outer ends of the two wedges J—J.

The retainer bolts K ar preferably two in number and each is anchored at its inner end to a rib 21 and at its outer end in a suitable socket to the follower F as best shown in Fig. 4. By means of the bolts K, the parts are held in assembled relation and any desired tension or compression may be imposed upon the series of spring plates G and the springs B also placed under initial compression.

The operation of the mechanism is as follows assuming an inward or buffing movement of the draw bar. As the draw bar moves inwardly, the follower F is moved in the same direction simultaneously and uniformly therewith. Initially, due to the space 24 between the follower F and the plates E, no movement of the friction plates will occur, but on the contrary, the spreader spring plates G will be partially straightened out thereby exerting increased lateral pressure on the two groups of friction plates. Also, during the initial portion of the compression action, the wedges J will be forced a slight distance longitudinally relatively of the shoes H. The latter will also be caused to slide lengthwise of the innermost friction plates E. This last action causes the spring follower C to be removed from the inner ends of the plates E prior to the engagement of the latter by the follower F. By the time the follower F comes into engagement with the plates E, the desired lateral pressure or spreading action will have been set up between the groups of plates and thereafter the resistance will be augmented by the plates E sliding against the plates D. With this arrangement, excessive lateral pressure on the friction elements is avoided and I am enabled to obtain a smooth, uniform action throughout the entire compression stroke.

In release, upon removal of the actuating force, the spreader spring plates G will immediately react to assume their normal curvature, thus relieving the pressure between the wedges J and shoes H. It will be observed that this action occurs without the use of any anti-friction rollers or other anti-friction means. Upon release of the pressure between the wedges J and shoes H as above described, the springs B will then project the entire wedging system or unit outwardly relatively to the friction plates until the spring follower C picks up the inner ends of the plates E. Thereafter the plates E are projected outwardly in unison with the spreader system until the normal position of the parts is restored.

As wear occurs on the cooperating surfaces of the stationary and movable plates E and between the shoes H and the plates E engaged thereby, the wedges J gradually creep up on the wedge surfaces of the shoes H, thus automatically compensating for wear of the parts, as will be understood.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a follower acting member; of a plurality of relatively stationary friction plates carried by said member; a plurality of relatively longitudinally movable friction plates intercalated with respect to said stationary plates; a spring resistance; a lateral pressure creating means co-operable with the intercalated plates including a pressure transmitting element; friction wedge shoes co-operable with the plates, wedges co-operable with said friction wedge shoes, each of said friction wedge shoes being provided with a pair of wedge faces co-acting with a pair of wedge faces on each of said wedges, and bowed flexible plate springs interposed between said element and wedges.

2. In a friction shock absorbing mechanism, the combination with a follower acting member; of a plurality of relatively stationary friction plates carried by said member; a plurality of relatively longitudinally movable friction plates intercalated with respect to said stationary plates; a spring resistance; and lateral pressure creating means co-operable with the intercalated plates including, a pressure transmitting element, a plurality of wedge members, each provided with front and rear spaced apart wedge faces, friction shoes co-operable with the plates, each of said friction shoes being provided with front and rear spaced apart wedge faces engaging the spaced wedge faces of one of said wedge members, and flexible spring plates interposed between said element and the wedge members and between said front and rear wedge faces.

3. In a friction shock absorbing mechanism, the combination with a casting, having a casing at one end and an integrally formed spring cage; of a spring resistance within said cage; a plurality of relatively stationary friction plates anchored in said casing against longitudinal movement with respect thereto; a plurality of relatively movable friction plates alternating with said stationary plates, said plates being divided into two laterally separated groups; a spring follower interposed between said spring resistance and the inner ends of said movable friction plates; a pair of wedge friction shoes each engaging a plate on its outer side and said follower at its inner end, a pair of wedges, each co-operating with a friction shoe on the inner side of the latter; said wedges each being provided with a flat bearing face; a plurality of like nested bowed spring plates of equal length, interposed between said wedges, with the opposite ends of each plate abutting the flat bearing faces of said wedges and a pressure transmitting follower adapted to engage said plate springs, said follower being normally separated a slight distance from the outer ends of the movable friction plates.

4. In a friction shock absorbing mechanism, the combination with a follower acting member; of a front follower; a plurality of relatively stationary friction plates anchored to said member against longitudinal movement with respect thereto; a plurality of relatively movable friction plates alternated with said stationary friction plates, and having their outer ends normally spaced a slight distance from the front follower, all of said plates being freely responsive to laterally applied pressure and divided into two separate groups; a spring resistance; a spring follower interposed between said spring resistance and the inner ends of said movable friction plates; and lateral pressure creating means disposed centrally between said groups of plates, said means comprising a pair of wedge friction shoes each engaging a plate on its outer side and said spring follower at its inner end, a pair of wedges, each co-operable with a friction shoe on the inner side of the latter, said wedges each being provided with a flat bearing face, and a plurality of like nested elongated spring plates interposed between said wedges, said plates being bowed in the direction of their length, and each of said plates having its opposite ends bearing on the flat bearing faces of said wedges, said spring plates adapted to be engaged by and receive pressure from said front follower.

In witness that I claim the foregoing I have hereunto subscribed my name this 20th day of June 1921.

JOHN F. O'CONNOR.

Witnesses:
CARRIE GAILING,
ANN BAKER.